United States Patent [19]

Baldwin

[11] 3,878,002
[45] Apr. 15, 1975

[54] NITROGEN AND FLUORINE CONTAINING SOLID PROPELLANT COMPOSITIONS BASED ON ACRYLIC PREPOLYMER BINDERS

[75] Inventor: Mart G. Baldwin, Newtown, Pa.

[73] Assignee: The United States of America as represented by the Secretary of the Army, Washington, D.C.

[22] Filed: June 24, 1969

[21] Appl. No.: 836,178

Related U.S. Application Data

[63] Continuation-in-part of Ser. No. 227,109, Sept. 24, 1962.

[52] U.S. Cl. ............... 149/19.3; 149/19.91; 149/20; 149/76
[51] Int. Cl. .............................................. C06d 5/06
[58] Field of Search ...... 149/19, 20, 76, 19.3, 19.91

[56] References Cited
UNITED STATES PATENTS
3,441,549   4/1969   Gardiner et al. .................... 260/88.3
3,441,550   4/1969   Zimmerman ...................... 260/89.5

Primary Examiner—Stephen J. Lechert, Jr.
Attorney, Agent, or Firm—Robert P. Gibson; Nathan Edelberg, Jack W. Voigt

[57] ABSTRACT

Nitrogen and fluorine containing solid propellant compositions may be based on NF acrylic prepolymers rather than monomer polymerization. The prepolymers used to make the propellant compositions desired consist of certain acrylates such as 2,3-bis(difluoraminopropyl) acrylate with minor amounts of either acrylic acid or an hydroxyl-containing acrylate or methacrylate such as hydroxypropyl methacrylate together with an appropriate plasticizer. The propellant formed from the NF prepolymer systems avoids the cure problems encountered with propellant compositions based on monomer polymerization.

10 Claims, No Drawings

NITROGEN AND FLUORINE CONTAINING SOLID PROPELLANT COMPOSITIONS BASED ON ACRYLIC PREPOLYMER BINDERS

CROSS-REFERENCES TO APPLICATION APPLICATIONS:

This application is a continuation-in-part of copending U.S. patent application Ser. No. 227,109, filed Sept. 24, 1962.

BACKGROUND OF THE INVENTION

This invention relates to a novel solid propellant composition, and particularly to one of the NF type.

NF propellant compositions have been under development for about 5 years. Early work utilized a process of curing the propellant composition by means of monomer polymerization directly in the propellant mix after casting. Propellants of the NF type made in this way demonstrated good ballistic properties, but serious shortcomings (associated with cure shrinkage and the exotherm arising from the monomer polymerization) were encountered. Accordingly, NF type propellant compositions made by a different system were investigated.

The principal object of the invention is to provide an improved propellant composition of the NF type.

A particular object of this invention is to provide such a propellant composition made from an NF prepolymer system rather than monomer polymerization.

SUMMARY OF THE INVENTION

Nitrogen and fluorine containing propellant compositions may be based on NF acrylic prepolymers rather than monomer polymerization. The prepolymers used to make the propellant compositions desired consist of certain acrylates such as 2,3-bis(difluoraminopropyl) acrylate together with minor amounts of either acrylic acid or an hydroxyl-containing acrylate or methacrylate such as hydroxypropyl methacrylate. An appropriate plasticizer for use with the type prepolymers noted above is 1,2,3-tris[1,2-bis(difluoramino)ethoxy] propane commonly referred to as TVOPA. A method for the preparation of TVPOA is set forth below. The propellant composition also contains an oxidizer such as ammonium perchlorate and, optionally, a metal fuel such as aluminum powder.

TVOPA is prepared by reacting Tris(vinoxy)propane (prepared in accordance with U.S. Pat. No. 2,969,400) with tetrafluorohydrazine. TVOPA contains two high energy difluoramino groups, $NF_2$, in each of the three vinoxy groups of the starting compound, tris(vinoxy)propane. The reaction of tetrafluorohydrazine with tris(vinoxy)propane to form TVOPA is conducted under pressure in the range of 500 mm of mercury up to about 600 psig and temperature range of about 0° to 120°C. The reaction is conducted in the presence of an inert volatile organic solvent, preferably one that is a suitable solvent for both the TVOPA as well as the reactant. Aromatic and aliphatic hydrocarbons, chlorinated hydrocarbons, ethers and ketones may be employed as the solvent. Typical solvents include diethyl ether, dipropyl ether, pentane, hexane, chloroform, carbon tetrachloride, methylene chloride, benzene, toluene, xylene, and acetone.

For further information about the preparation of TVOPA refer to U.S. patent application Ser. No. 363,680, filed Apr. 27, 1964.

DESCRIPTION OF THE PREFERRED EMBODIMENT

Nitrogen and fluorine containing propellant composition may be based on NF acrylic prepolymers rather than monomer polymerization. The prepolymers used to make the propellant compositions desired consist of low molecular weight copolymers of 2,3-bis(difluoraminopropyl) acrylate (NFPA) with minor amounts of either acrylic acid or an hydroxyl-containing acrylate or methacrylate such as hydroxypropyl methycrylate (HPMA) to provide cross-link sites. Many other acrylates can be used as the major component of the propellant binder replacing the 2,3-bis(difluoraminopropyl) acrylate, or as minor components to impart particularly desired properties to the binder. Of particular interest are alkyl acrylates, such as methyl, ethyl, butyl, and 2-ethylhexyl acrylates, which can be used in a manner analogous to that described below for 2,3-bis(difluoroaminopropyl) acrylate. An example of such a prepolymer preparation is given below, followed by a description of the preparation of a specific propellant composition.

PREPOLYMER PREPARATION

A solution of 95.0 g. NFPA, 5.0.g. acrylic acid and 1.0 g. benzoyl peroxide in 350 grams of ethyl acetate is prepared and heated under reflux conditions for 16 hours, during which period complete polymerization occurs. The polymer, which can be obtained by precipitating the reaction mixture into hexane, is a rubbery solid with an intrinsic viscosity in acetone of 0.12 and a number average molecular weight of about 6000.

NFPA/HPMA prepolymer can be prepared by an identical procedure to that for NFPA/acrylic acid with the exception that 90.0 grams NFPA and 10.0 g. HPMA are used.

PROPELLANT PREPARATION

A typical propellant composition bsed on NFPA/acrylic acid prepolymer follows:

| | |
|---|---|
| NFPA/acrylic acid prepolymer | 13.0 wt. % |
| 1,2,3-Tris[1,2-bis(difluoramino)ethoxy] propane liquid plasticizer(TVOPA) | 26.0 |
| Ammonium perchlorate | 46.0 |
| Aluminum powder | 15.0 |
| 3,4-Epoxycyclohexylmethyl 3,4-epoxycyclohexanecarboxylate (diepoxide curing agent)(added per 100 grams of propellant composition) | 1.7 grams |

Instead of or in addition to the ingredients in the above propellant composition, acrylic prepolymers based on other acrylates (as described above) can be used. Also, other plasticizers such as common nitrate plasticizers, (triethylene glycol dinitrate or glycerol trinitrate) instead of or in admixture with, TVOPA can be used. Other oxidizers, in particular cyclohexamethylene (HMX) and potassium perchlorate can be used in place of ammonium perchlorate. The propellant composition preparation is the samae as that described below for the above propellant composition, in any case.

Generally speaking, the oxidizer is present in amounts of about 30% to about 60% by weight in the propellant composition, the prepolymer in amounts of about 8% to about 16%, the metal fuel in amounts of from 0% to about 20%, and the plasticizer in amounts of 0% to about 40%. Preferably, the plasticizer is present in an amount of at least about 20%, particularly about 26%. The plasticizer should be used because of the physical properties it imparts to the propellant composition.

If desired, burning rate catalyst (or other additives) such as copper chromite may be incorporated in the propellant composition in small amounts.

If the second monomer used to form the prepolymer is acrylic acid, the curing (crosslinking) agent is, in general, a diepoxide crosslinking agent such 3,4-epoxycyclohexylmethyl 3,4-epoxyclclohexanecarboxylate.

If the second monomer used to form the prepolymer is an hydroxyl-containing acrylate or methacrylate, the curing (crosslinking) agent is, in general, a diisocyanate such as toluene 2,4-diisocyanate or hexamethylene diisocyanate.

Small mixes of the above propellant composition were prepared as follows:

To NFPA/acrylic acid prepolymer solution prepared as described above is added the appropriate amount of TVOPA to give a mixture of 2 parts TVOPA and 1 part NFPA/acrylic acid prepolymer. The solvent is stripped under vacuum and the resulting clear, viscous solution is weighed into a glass resin kettle. 3,4-Epoxycyclohexylmethyl 3,4-epoxycyclohexanecarboxylate (curing agent) and solid ingredients are added (the ammonium perchlorate being added slowly), while the mix is being stirred. The mix is stirred under vacuum at 50°C. for 30 minutes, poured into small motors, and cured for 40 hours at 50°C.

Another propellant composition, the same as that given above, with the exception that NFPA/HPMA prepolymer is used instead of NFPA/acrylic acid prepolymer and hexamethylene diisocyanate is used instead of the 3,4-epoxycyclohexymethyl 3,4-epoxycyclohexanecarboxylate as the curing agent (0.4% by weight added), may be made by the same procedure.

1,2,2,5,6,9,9,10-Octakis(difluoramino)-4,7-dioxadecane may also be used as a plasticizer with either prepolymer to yield very fast burning, high energy propellants.

1,2,2,5,6,9,9,10-Octakis(difluoramino)-4,7-dioxadecane, also known as 1,2,-di-[2,2,3-tris(difluoramino)propoxy]-1,2,bis(difluoramino)-ethane, is represented by the following structure:

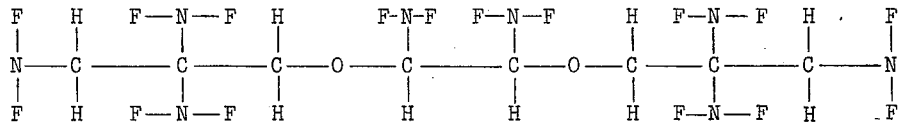

The complete process for the preparation of this compound involves the following series of reactions:

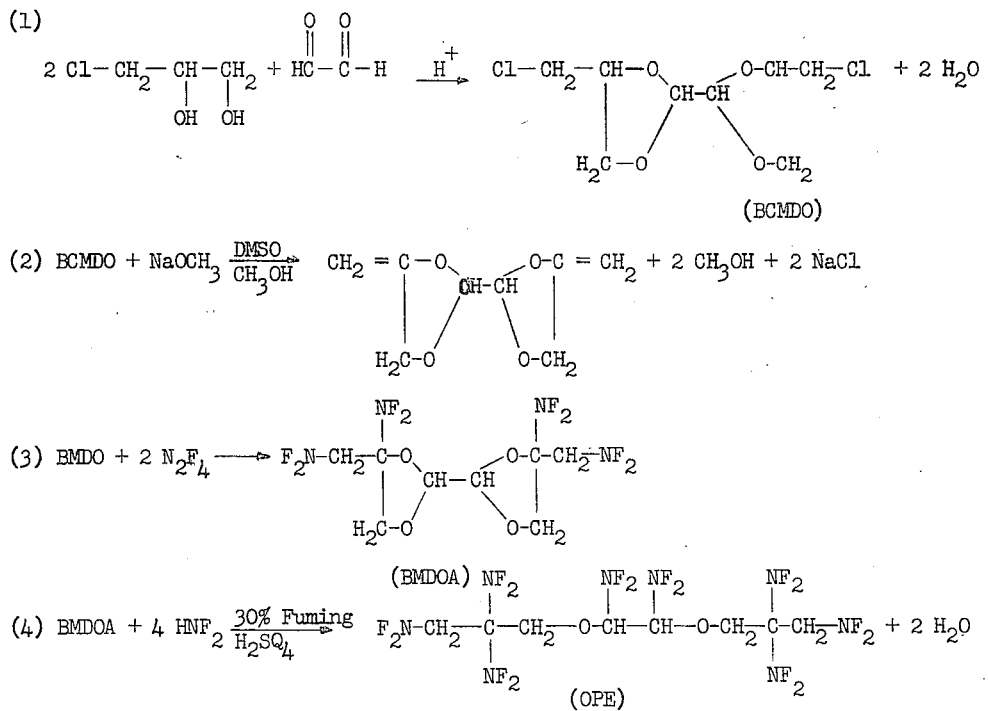

In reaction (1) 4,4,'-bis(chloromethyl)-2,2'-bi-1,3 dioxolane (BCMDO) is prepared from 3-chloro-1,2-propanediol and crystalline — 80% glyoxal using Amberlyst-15(ion exchange resin) acid catalyst. At first the BCMDO was prepared according to the literature using 30% aqueous glyoxal and sulfuric acid catalyst, but here some difficulty was encountered with hydroxyl and carbonyl-containing impurities. Consistent yields of about 95% are obtaianed in the current method and it is found unnecessary to distill the crude BCMDO. 4,-4'-Dimethylene-(2,2'-bi-1,3-dioxolane)(BMDO) is obtained in reaction (2) by reaction of the BCMDO with sodium methoxide in methanol and dimethyl sulfoxide. The yield of crude BMDO is about 85% and the purity is such that futher purification by distillation is not necessary.

4,4'-Bis(difluoramino)-4,4'-bis(difluoraminomethyl)(2,2'-bi'1,3-dioxolane) (BMDOA) in reaction (3) is prepared from BMDO (in chloroform) and tetrafluorohydrazine ($N_2F_4$) in a high pressure-rocking bomb static reactor. The production of about 60 grams per run is a convenient scale, the yields averaging about 95% of the theoretical. The production of BMDOA was at first attempted in a high-pressure liquid phase flow reactor, but considerable difficulty was encountered because of the tendency for a solid material to be deposited in the reactor lines causing a plug. The solids may arise from at least two sources: an insoluble stereoisomeric form of BMDO and degradation of the olefin by hydrogen fluoride.

The final step (reaction 4) consists of adding BMDOA in Freon-113 (1.44 ml. of solvent per gram of adduct) to a mixture of $HNF_2$ and 30% fuming sulfuric acid. The $HNF_2$ is generated immediately prior to use from aqueous difluorourea.

The reaction is followed by a washing step during which the product is isolated in a solution of methylene chloride. The crude product is further refined by column chromatography using silica gel and 6/1 pentane; methylene chloride solvent.

By means of the general procedures described above, a wide range of propellant compositions can be made by varying the ingredients and/or their ratios. The burning rates, mechanical properties, smoke characteristics, sensitivity, thermal stability and other properties of the propellant depend on the particulaar composition chosen, and selection of the optimum propellant composition for a particular purpose requires a knowledge of the effects of compositional variables on propellant properties, which is known to those skilled in the art.

A number of applications in the area of tactical military rockets exist for high energy, high burning rate propellants such as those described herein.

I claim:

1. A propellant composition comprising a cured intimate mixture of from about 30% to about 60% by weight solid, inorganic, oxidizing salt, and from about 8% to about 16% by weight of a polymer, said polymer being a reaction product of an acrylate or an alkyl acrylate with at least one of the compounds selected from the group consisting of an acrylic acid, an hydroxyl-containing acrylate and an hydroxyl-containing methacrylate, said acrylate being an acrylate of $NF_2$-containing polymers and said alkyl acrylate being selected from methyl, ethyl, butyl, and 2-ethylhexyl acrylates.

2. The propellant composition of claim 1 additionally comprising a plasticizer.

3. The propellant composition of claim 2 wherein said plasticizer is present in an amount of from about 20% to about 40% by weight.

4. The propellant composition of claim 3 wherein said plasticizer is an $NF_2$-containing plasticizer.

5. The propellant composition of claim 4 wherein said acrylate is 2,3-bis(difluoroamino)-propyl acrylate.

6. The propellant composition of claim 5 wherein said plasticizer is 1,2,3-tris[1,2-bis(difluoramino)ethoxy] propane, and said inorganic, oxidizing salt is ammonium perchlorate.

7. The propellant composition of claim 5 wherein said plasticizer is 1,2,2,5,6,9,9,10-octakis(difluoramino)-4,7-dioxadecane and said inorganic, oxidizing salt is ammonium perchlorate.

8. The propellant composition of claim 3 wherein said polymer is crosslinked with a diepoxide curing agent and the selected compound is acrylic acid.

9. The propellant composition of claim 8 wherein said polymer is crosslinked with a diisocyanate curing agent and the selected comound is hydroxypropyl methacrylate.

10. The propellant composition of claim 1 wherein said polymer is comprised of a combination of a reaction product of said acrylate with at least one of the compounds selected from the group consisting of an acrylic acid, an hydroxyl-containing acrylate, and an hydroxyl-containing methacrylate and a reaction product of said alkyl acrylate with at least one of the compounds selected from the group consisting of an acrylic acid, an hydroxyl-containing acrylate, and an hydroxyl-containing methacrylate.

* * * * *